United States Patent Office 3,136,774
Patented June 9, 1964

3,136,774
2-CHLORO-3-ARYL-4-METHYL-IMIDAZOLIUM CHLORIDES
Paul J. Stoffel, St. Louis, Mo., assignor to Monsanto Company, St. Louis, Mo., a corporation of Delaware
No Drawing. Filed Dec. 22, 1961, Ser. No. 161,380
12 Claims. (Cl. 260—309)

This invention relates to the synthesis of new and useful 4-methyl-imidazol-2-ones and to new and useful 2-chloro-4-methyl-imidazolium chloride precursors therefor.

The 4-methyl-imidazol-2-ones of this invention can be represented by the formula

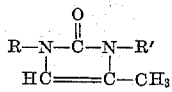

wherein R is a hydrocarbyl radical containing up to 12 carbon atoms and is free of acetylenic unsaturation or said hydrocarbyl radical having substituents such as lower alkoxy, nitro, and halogen having an atomic weight in the range of 35 to 80 (i.e., chlorine or bromine) and wherein R' is phenyl (i.e., $C_6H_5$) or said phenyl radical having substituents such as lower alkyl, lower alkoxy, nitro, and halogen of atomic weight in the range of 35 to 80 (i.e., chlorine or bromine).

The 2-chloro-4-methyl-imidazolium chloride precursors of the aforementioned 4-methyl-imidazol-2-ones possess resonance about the 2 carbon atom and can be represented by the formula

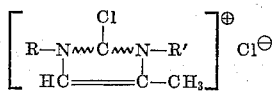

wherein R and R' have the aforedescribed significance and wherein but one of the ⁓'s is a double bond the other being a single bond.

The 4-methyl-imidazol-2-ones of this invention are prepared by initially reacting phosphorus pentachloride with N-propargyl substituted urea of the formula

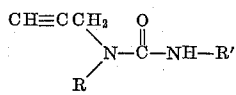

wherein R and R' have the aforedescribed significance and then treating the 2-chloro-4-methyl-imidazolium chloride so obtained with base, e.g., alkali metal hydroxides such as sodium or potassium hydroxide. These procedural operations can be set forth schematically as follows

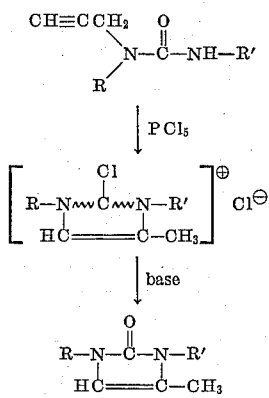

wherein R and R' have the aforedescribed significance and wherein the respective ⁓'s have the aforedescribed significance.

As illustrative of the synthesis of 4-methyl-imidazol-2-ones of this invention is the following:

Example I

To a suitable reaction vessel equipped with a thermometer, agitator and reflux condenser is charged 50.0 parts by weight of phosphorus pentachloride, 120 parts by weight of benzene, and 67.0 parts by weight of 1-(3,4-dichlorophenyl)-3-isopropyl-3-(prop-2-ynyl) urea. The so charged mass is refluxed for 4 hours. The reaction mass is cooled to room temperature and filtered. The filter cake is washed with diethyl ether and dried. The dried solid product (60.5 parts by weight) is 2-chloro-3-(3,4-dichlorophenyl)-1-isopropyl-4-methyl-imidazolium chloride. After recrystallizing from chloroform this solid melted at 275° C. with decomposition.

To a suitable reaction vessel equipped with a thermometer and agitator is charged 17.0 parts by weight of 2-chloro - 3 - (3,4 - dichlorophenyl)-1-isopropyl-4-methyl-imidazolium chloride and 50 parts by weight of water. The resulting solution is made alkaline with 25 parts by weight of 20% aqueous sodium hydroxide. The precipitate is filtered off and dried. The dried solid product (13.1 parts by weight) is 3-(3,4-dichlorophenyl)-1-isopropyl - 4-methyl - imidazol-2-one. After recrystallizing from ethyl acetate the melting point is found to be 112.1–112.6° C.

Example II

Employing the procedure of Example I but replacing 1 - (3,4-dichlorophenyl)-3-isopropyl-3-(prop-2-ynyl) urea with an equimolecular amount of 1-(3,4,5-trichlorophenyl)-3-ethyl-3-(prop-2-ynyl) urea there is obtained 2-chloro - 3-(3,4,5-trichlorophenyl)-1-ethyl-4-methyl-imidazolium chloride, which chloride on treatment with aqueous potassium hydroxide provides 3 - (3,4,5 - trichlorophenyl)-1-ethyl-4-methyl-imidazol-2-one.

Example III

Employing the procedure of Example I but replacing 1 - (3,4-dichlorophenyl)-3-isopropyl-3-(prop-2-ynyl) urea with an equimolecular amount of 1-(4-bromophenyl)-3-methyl-3-(prop-2-ynyl) urea there is obtained 2-chloro-3 - (4-bromophenyl)-1,4-dimethyl-imidazolium chloride, which chloride on treatment with aqueous potassium hydroxide provides 3-(4-bromophenyl)-1,4-dimethyl-imidazol-2-one.

Example IV

To a suitable reaction vessel equipped with a thermometer, agitator and reflux condenser is charged 36.9 parts by weight of phosphorus pentachloride, 100 parts by weight of benzene, and 44.5 parts by weight of 1-(4-chlorophenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (40.2 parts by weight) is 2-chloro-3-(4-chlorophenyl) - 1-isopropyl-4-methyl-imidazolium chloride. After recrystallizing from chloroform this solid melted at 268° C. with decomposition.

To a suitable reaction vessel equipped with a thermometer and agitator is charged 15.3 ports by weight of 2-chloro - 3-(4-chlorophenyl)-1-isopropyl-4-methyl-imidazolium chloride and 100 parts by weight of water. The resulting solution is made alkaline with 20 parts by weight of 20% aqueous sodium hydroxide. The precipitate is filtered off and dried. The dried product (10.7 parts by weight) is 3-(4-chlorophenyl)-1-isopropyl-4-methylimidazol-2-one. After recrystallizing from ethyl acetate the melting point is found to be 137.6–138.5° C.

Example V

Employing the procedure of Example IV but replacing 1-(4-chlorophenyl)-3-isopropyl-3-(prop-2-ynyl) urea with an equimolar amount of 1-(4-chlorophenyl)-3-phenyl-3-(prop-2-ynyl) urea there is obtained 2-chloro-3-(4-chlorophenyl)-1-phenyl-4-methyl-imidazolium chloride, which chloride on treatment with aqueous sodium hydroxide provides 3-(4-chlorophenyl)-1-phenyl-4-methyl-imidazol-2-one.

Example VI

Employing the precedure of Example IV but replacing 1 - (4 - chlorophenyl)-3-isopropyl-3-(prop-2-ynyl) urea with an equimolar amount of 1-(4-chlorophenyl)-3-benzyl-3-(prop-2-ynyl) urea there is obtained 2-chloro-3-(4-chlorophenyl)-1-benzyl-4-methyl-imidazolium chloride, which chloride on treatment with aqueous sodium hydroxide provides 3-(4-chlorophenyl)-1-benzyl-4-methyl-imidazol-2-one.

Example VII

Employing the procedure of Example IV but replacing 1-(4-chlorophenyl)-3-isopropyl-3-(prop-2-ynyl) urea with an equimolar amount of 1-(4-chlorophenyl)-3-(2-ethylhexyl)-3-(prop-2-ynyl) urea there is obtained 2-chloro-3 - (4-chlorophenyl)-1-(2-ethylhexyl)-4-methyl-imidazolium chloride, which chloride on treatment with aqueous sodium hydroxide provides 3-(4-chlorophenyl)-1-(2-ethylhexyl-4-methyl-imidazol-2-one.

Example VIII

Employing the procedure of Example IV but replacing 1-(4-chlorophenyl)-3-isopropyl-3-(prop-2-ynyl) urea with an equimolar amount of 1-(4-chlorophenyl)-3-(4-nitrophenyl)-3-(prop-2-ynyl) urea there is obtained 2-chloro-3- ( 4-chlorophenyl)-1-(4-nitrophenyl-4-methyl-imidazolium chloride, which chloride on treatment with aqueous sodium hydroxide provides 3-(4-chlorophenyl)-1-(4-nitrophenyl)-4-methyl-imidazol-2-one.

Example IX

To a suitable reaction vessel equipped with a thermometer, agitator and reflux condenser is charged 40.0 parts by weight of phosphorus pentachloride, 100 parts by weight of benzene, and 49.0 parts by weight of 1-(2-chlorophenyl)-3-isopropyl-3-(prop-2 - ynyl) urea. The so charged mass is refluxed for 6 hours. The reaction mass is cooled to room temperature and filtered. The filter cake is washed with diethyl ether and dried. The dried solid product (11.9 parts by weight) is 2-chloro-3-(2-chlorophenyl)-1-isopropyl - 4 - methyl-imidazolium chloride. After recrystallizing from chloroform this solid melted at 254° C. with decomposition.

To a suitable reaction vessel equipped with a thermometer and agitator is charged 15.2 parts by weight of 2-chloro - 3 - (2-chlorophenyl)-1-isopropyl-4-methyl-imidazolium chloride and 50 parts by weight of water. The resulting solution is made alkaline with 20 parts by weight of 20% aqueous sodium hydroxide. The precipitate is filtered off and dried. The dried product (11.5 parts by weight) is 3-(2-chlorophenyl)-1-isopropyl-4-methyl-imidazol-2-one. After recrystallizing from ethyl acetate the melting point is found to be 115.5–116.4° C.

Example X

Employing the procedure of Example IX but replacing 1-(2-chlorophenyl)-3-isopropyl-3-(prop-2-ynyl) urea with an equimolecular amount of 1-(2-chloro-4-methylphenyl)-3-n-butyl-3-(prop-2-ynyl) urea there is obtained 2-chloro - 3-(2-chloro-4-methylphenyl-1-n-butyl-4-methyl-imidazolium chloride, which chloride on treatment with aqueous sodium hydroxide provides 3-(2-chloro-4-methylphenyl)-1-n-butyl-4-methyl-imidazol-2-one.

Example XI

Employing the procedure of Example IX but replacing 1-(2-chlorophenyl)-3-isopropyl-3-(prop-2-ynyl) urea with an equimolar amount of 1-(2-chloro-4-methylphenyl)-3-sec. butyl-3-(prop-2-ynyl) urea there is obtained 2-chloro - 3 - (2-chloro-4-methylphenyl)-1-sec. butyl-4-methyl-imidazolium chloride, which chloride on treatment with aqueous sodium hydroxide provides 3-(2-chloro-4-methylphenyl)-1-sec. butyl - 4-methyl-imidazol-2-one.

Example XII

Employing the procedure of Example IX but replacing 1-(2-chlorophenyl)-3-isopropyl-3-(prop-2-ynyl) urea with an equimolar amount of 1-(2-chloro-4-nitrophenyl)-3-sec. butyl-3-(prop-2-ynyl) urea there is obtained 2-chloro-3-(2-chloro-4-nitrophenyl)-1-sec. butyl-4-methyl-imidazolium chloride, which chloride on treatment with aqueous sodium hydroxide provides 3-(2-chloro-4-nitrophenyl)-1-sec. butyl-4-methyl-imidazol-2-one.

Example XIII

To a suitable reaction vessel equipped with a thermometer, agitator and reflux condenser is charged 25.0 parts by weight of phosphorus pentachloride, 100 parts by weight of benzene, and 30.0 parts by weight of 1-(4-nitrophenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (24.4 parts by weight) is 2-chloro-3-(4-nitrophenyl)-1-isopropyl-4-methyl-imidazolium chloride which material is highly hygroscopic.

To a suitable reaction vessel equipped with a thermometer and agitator is charged 15.8 parts by weight of 2-chloro-3-(4-nitrophenyl)-1-isopropyl-4-methyl- imidazolium chloride and 50 parts by weight of water. The resulting solution is made alkaline with 30 parts by weight of 20% aqueous sodium hydroxide. The precipitate is filtered off and dried. The dried product (11.1 parts by weight) is 3-(4-nitrophenyl)-1-isopropyl-4-methyl-imidazol-2-one. After recrystallizing from ethyl acetate the melting point is found to be 114.7–115.7° C.

Example XIV

Employing the procedure of Example XIII but replacing 1-(4-nitrophenyl)-3-isopropyl-3-(prop-2-ynyl) urea with an equimolar amount of 1-(2,4-dinitrophenyl)13-ethyl-3-(prop-2-ynyl) urea there is obtained 2-chloro-3-(2,4-dinitrophenyl)-1-ethyl-4-methyl-imidazolium chloride, which chloride on treatment with aqueous sodium hydroxide provides 3-(2,4-dinitrophenyl)-1-ethyl-4-methyl-imidazol-2-one.

Example XV

Employing the procedure of Example XIII but replacing 1-(4-nitrophenyl)-3-isopropyl-3-(prop-2-ynyl) urea with an equimolecular amount of 1-(2-nitro-4-methylphenyl)-3-ethyl-3-(prop-2-ynyl) urea there is obtained 2-chloro -3-(2-nitro-4-methylphenyl)-1-ethyl-4-methyl-imidazolium chloride, which chloride on treatment with aqueous sodium hydroxide provides 3-(2-nitro-4-methylphenyl)-1-ethyl-4-methyl-imidazol-2-one.

Example XVI

Employing the procedure of Example XIII but replacing 1-(4-nitrophenyl)-3-isopropyl-3-(prop-2-ynyl) urea with an equimolecular amount of 1-(2,4-dinitrophenyl)-3-(pent-2-enyl)-3-(prop-2-ynyl) urea is there obtained 2-chloro - 3-(2,4-dinitrophenyl)-1-(pent-2-enyl)-4-methyl-imidazolium chloride, which chloride on treatment with aqueous sodium hydroxide provides 3-(2,4-dinitrophenyl)-1-(pent-2-enyl)-4-methyl-imidazol-2-one.

Example XVII

Employing the procedure of Example XIII but replacing 1 - (4-nitrophenyl)-3-isopropyl-3-(prop-2-ynyl) urea with an equimolecular amount of 1-(2,4-dinitrophenyl)-3-(4-biphenylyl)-3-(prop-2-ynyl) urea there is obtained 2-chloro-3-(2,4-dinitrophenyl)-1-(4-biphenylyl)-4-methyl-imidazolium chloride, which chloride on treatment with aqueous sodium hydroxide provides 3-(2,4-dinitrophenyl)-1-(4-biphenylyl)-4-methyl-imidazol-2-one.

*Example XVIII*

Employing the procedure of Example XIII but replacing 1-(4-nitrophenyl)-3-isopropyl-3-(prop-2-ynyl) urea with an equimolecular amount of 1-(2,4-dinitrophenyl)-3-(2-naphthyl)-3-(prop-2-ynyl) urea there is obtained 2-chloro - 3 - (2,4-dinitrophenyl)-1-(2-naphthyl)-4-methyl-imidazolium chloride, which chloride on treatment with aqueous sodium hydroxide provides 3-(2,4-dinitrophenyl)-1-(2-naphthyl)-4-methyl-imidazol-2-one.

*Example XIX*

To a suitable reaction vessel equipped with a thermometer, agitator and reflux condenser is charged 44.0 parts by weight of phosphorus pentachloride, 100 parts by weight of benzene, and 46.0 parts by weight of 1-(4-methylphenyl)-3-isopropyl-3-(prop-2-ynyl) urea. The so charged mass is refluxed for 6 hours. The reaction mass is cooled to room temperature and filtered. The filter cake is washed with diethyl ether and dried. The dried solid product (41.4 parts by weight) is 2-chloro-3-(4-methylphenyl)-1-isopropyl-4-methyl-imidazolium chloride which material is highly hygroscopic.

To a suitable reaction vessel equipped with a thermometer and agitator is charged 28.5 parts by weight of 2-chloro - 3-(4-methylphenyl)-1-isopropyl-4-methyl-imidazolium chloride and 100 parts by weight of water. The resulting solution is made alkaline with 50 parts by weight of 20% aqueous sodium hydroxide. The precipitate is filtered off and dried. The dried product (15.8 parts by weight) is 3-(4-methylphenyl)-1-isopropyl-4-methyl-imidazol-2-one. After recrystallizing from ethyl acetate the melting point is found to be 118.7–119.4° C.

*Example XX*

Employing the procedure of Example XIX but replacing 1-(4-methylphenyl)-3-isopropyl-3-(prop-2-ynyl) urea with an equimolecular amount of 1-(3,5-dimethylphenyl)-3-isobutyl-3-(prop-2-ynyl) urea there is obtained 2-chloro - 3-(3,5-dimethylphenyl)-1-isobutyl-4-methyl-imidazolium chloride, which chloride on treatment with aqueous sodium hydroxide provides 3-(3,5-dimethylphenyl)-1-isobutyl-4-methyl-imidazol-2-one.

*Example XXI*

Employing the procedure of Example XIX but replacing 1-(4-methylphenyl)-3-isopropyl-3-(prop-2-ynyl) urea with an equimolecular amount of 1-(4-t. butylphenyl)-3-isobutyl-3-(prop-2-ynyl) urea there is obtained 2-chloro-3 - (4 - t. butylphenyl)-1-isobutyl-4-methyl-imidazolium chloride, which chloride on treatment with aqueous sodium hydroxide provides 3-(4-t. butylphenyl)-1-isobutyl-4-methyl-imidazol-2-one.

*Example XXII*

Employing the procedure of Example XIX but replacing 1-(4-methylphenyl)-3-isopropyl-3-(prop-2-ynyl) urea with an equimolecular amount of 1-(4-isohexylphenyl)-3-isobutyl-3-(prop-2-ynyl) ureat here is obtained 2-chloro-3 - (4 - isohexylphenyl)-1-isobutyl-4-methyl-imidazolium chloride, which chloride on treatment with aqueous sodium hydroxide provides 3-(4-isohexylphenyl)-1-isobutyl-4-methyl-imidazol-2-one.

*Example XXIII*

Employing the procedure of Example XIX but replacing 1-(4-methylphenyl)-3-isopropyl-3-(prop-2-ynyl) urea with an equimolecular amount of 1-(4-cumyl)-3-isobutyl 3-(prop-2-ynyl) urea there is obtained 2-chloro-3-(4-cumyl)-1-isobutyl-4-methyl-imidazolium chloride, which chloride on treatment with aqueous sodium hydroxide provides 3-(4-cumyl)-1-isobutyl-4-methyl-imidazol-2-one.

*Example XXIV*

Employing the procedure of Example XIX but replacing 1-(4-methylphenyl)-3-isopropyl-3-(prop-2-ynyl) urea witha n equimolecular amount of 1-(3,5-dimethylphenyl)-3-cyclohexyl-3-(prop-2-ynyl) urea there is obtained 2-chloro - 3 - (3,5-dimethylphenyl)-1-cyclohexyl-4-methyl-imidazolium chloride, which chloride on treatment with aqueous sodium hydroxide provides 3-(3,5-dimethylphenyl)-1-cyclohexyl-4-methyl-imidazol-2-one.

*Example XXV*

Employing the procedure of Example XIX but replacing 1-(4-methylphenyl)-3-isopropyl-3-(prop-2-ynyl) urea with an equimolecular amount of 1-(3,5-dimethylphenyl)-3-(3,4-dibromophenyl)-3-(prop-2-ynyl) urea there is obtained 2 - chloro-3-(3,5-dimethylphenyl)-1-(3,4-dibromophenyl)-4-methyl-imidazolium chloride, which chloride on treatment with aqueous sodium hydroxide provides 3 - (3,5-dimethylphenyl)-1-(3,4-dibromophenyl)-4-methyl-imidazol-2-one.

*Example XXVI*

To a suitable reaction vessel equipped with a thermometer, agitator and reflux condenser is charged 34.0 parts by weight of phosphorus pentachloride, 100 parts by weight of benzene, and 43.0 parts by weight of 1-(3,4-dichlorophenyl)-3-allyl-3-(prop-2-ynyl) urea. The so charged mass is refluxed for 6 hours. The reaction mass is cooled to room temperature and filtered. The filter cake is washed with diethyl ether and dried. The dried solid product (49.0 parts by weight) is 2-chloro-3-(3,4-dichlorophenyl) - 1-allyl-4-methyl-imidazolium chloride. After recrystallizing from chloroform this solid melted at 200° C. with decomposition.

To a suitable reaction vessel equipped with a thermometer and agitator is charged 16.9 parts by weight of 2-chloro-3-(3,4-dichlorophenyl)-1-allyl-4-methyl - imidazolium chloride and 50 parts by weight of water. The resulting solution is made alkaline with 20 parts by weight of 20% aqueous sodium hydroxide. The precipitate is filtered off and dried. The dried product (7.1 parts by weight) is 3-(3,4-dichlorophenyl)-1-allyl-4-methyl-imidazol-2-one. After recrystallizing from ethyl acetate the melting point is found to be 62.1–62.7° C.

*Example XXVII*

Employing the procedure of Example XXVI but replacing 1-(3,4-dichlorophenyl)-3-allyl-3-(prop - 2 - enyl) urea with an equimolecular amount of 1-(2,4,5-trichlorophenyl)-3-allyl-3-(prop-2-ynyl) urea there is obtained 2-chloro-3-(2,4,5-trichlorophenyl)-1-allyl-4 - methyl - imidazolium chloride, which chloride on treatment with aqueous sodium hydroxide provides 3-(2,4,5-trichlorophenyl)-1-allyl-4-methyl-imidazol-2-one.

*Example XXVIII*

Employing the procedure of Example XXVI but replacing 1-(3,4-dichlorophenyl)-3-allyl-3-(prop - 2 - ynyl) urea with an equimolecular amount of 1-(4-nitrophenyl)-3-allyl-3-(prop-2-ynyl) urea there is obtained 2-chloro-3-(4-nitrophenyl)-1-allyl-4-methyl-imidazolium chloride, which chloride on treatment with aqueous sodium hydroxide provides 3-(4-nitrophenyl)-1-allyl-4-methyl-imidazol-2-one.

*Example XXIX*

Employing the procedure of Example XXVI but replacing 1-(3,4-dichlorophenyl)-3-allyl-3-(prop - 2 - ynyl) urea with an equimolecular amount of 1-(2-chloro-4-nitrophenyl)-3-allyl-3-(prop-2-ynyl) urea there is obtained 2-chloro-3-(2-chloro-4-nitrophenyl)-1-allyl - 4 - methyl-imidazolium chloride, which chloride on treatment with aqueous sodium hydroxide provides 3-(2-chloro-4-nitrophenyl)-1-allyl-4-methyl-imidazol-2-one.

Example XXX

Employing the procedure of Example XXVI but replacing 1-(3,4-dichlorophenyl)-3-allyl-3-(prop-2-ynyl) urea with an equimolecular amount of 1-(3-chloro-4-bromophenyl)-3-allyl-3-(prop-2-ynyl) urea there is obtained 2-chloro-3-(3-chloro-4-bromophenyl)-1-allyl-4-methyl-imidazolinum chloride, which chloride on treatment with aqueous sodium hydroxide provides 3-(3-chloro-4-bromophenyl)-1-allyl-4-methyl-imidazol-2-one.

Example XXXI

Employing the procedure of Example XXVI but replacing 1-(3,4-dichlorophenyl)-3-allyl-3-(prop-2-ynyl) urea with an equimolecular amount of 1-(2,4,5-trichlorophenyl)-3-(dodec-1-enyl)-3-(prop-2-ynyl) urea there is obtained 2-chloro-3-(2,4,5-trichlorophenyl)-1-(dodec-1-enyl)-4-methyl-imidazolium chloride, which chloride on treatment with aqueous sodium hydroxide provides 3-(2,4,5-trichlorophenyl)-1-(dodec-1-enyl)-4-methyl-imidazol-2-one.

Example XXXII

To a suitable reaction vessel equipped with a thermometer, agitator and reflux condenser is charged 23.0 parts by weight of phosphorus pentachloride, 100 parts by weight of benzene, and 28.5 parts by weight of 1-(3,4-dichlorophenyl)-3-n-propyl-3-(prop-2-ynyl) urea. The so charged mass is refluxed for 6 hours. The reaction mass is cooled to room temperature and filtered. The filter cake is washed with diethyl ether and dried. The dried solid product (22.2 parts by weight) is 2-chloro-3-(3,4-dichlorophenyl)-1-n-propyl-4-methyl-imidazolium chloride. After recrystallizing from chloroform this solid melted at 238° C. with decomposition.

To a suitable reaction vessel equipped with a thermometer and agitator is charged 17.0 parts by weight of 2-chloro-3-(3,4-dichlorophenyl)-1-n-propyl-4-methyl-imidazolium chloride and 50 parts by weight of water. The resulting solution is made alkaline with 20 parts by weight of 20% aqueous sodium hydroxide. The precipitate is filtered off and dried. The dried product (7.9 parts by weight) is 3-(3,4-dichlorophenyl)-1-n-propyl-4-methyl-imidazol-2-one. After recrystallizing from ethyl acetate the melting point is found to be 62.9–63.4° C.

Example XXXIII

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-dodecyl-3-(prop-2-ynyl) urea there is obtained 2-chloro-3-(3,4-dichlorophenyl)-1-n-dodecyl-4-methyl-imidazolium chloride, which chloride on treatment with aqueous sodium hydroxide provides 3-(3,4-dichlorophenyl)-1-n-dodecyl-4-methyl-imidazol-2-one.

Example XXXIV

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-amyl-3-(prop-2-ynyl) urea there is obtained 2-chloro-3-(3,4-dichlorophenyl)-1-n-amyl-4-methyl-imidazolium chloride, which chloride on treatment with aqueous sodium hydroxide provides 3-(3,4-dichlorophenyl)-1-n-amyl-4-methyl-imidazol-2-one.

Example XXXV

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-n-octyl-3-(prop-2-ynyl) urea there is obtained 2-chloro-3-(3,4-dichlorophenyl)-1-n-octyl-4-methyl-imidazolium chloride, which chloride on treatment with aqueous sodium hyroxide provides 3-(3,4-dichlorophenyl)-1-n-octyl-4-methyl-imidazol-2-one.

Example XXXVI

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(2-ethoxyethyl)-3-(prop-2-ynyl) urea there is obtained 2-chloro-3-(3,4-dichlorophenyl)-1-(2-ethoxyethyl)-4-methyl-imidazolium chloride, which chloride on treatment with aqueous sodium hydroxide provides 3-(3,4-dichlorophenyl)-1-(2-ethoxyethyl)-4-methyl-imidazol-2-one.

Example XXXVII

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(2-chloroethyl)-3-(prop-2-ynyl) urea there is obtained 2-chloro-3-(3,4-dichlorophenyl)-1-(2-chloroethyl)-4-methyl-imidazolium chloride, which chloride on treatment with aqueous sodium hydroxide provides 3-(3,4-dichlorophenyl)-1-(2-chloroethyl)-4-methyl-imidazol-2-one.

Example XXXVIII

Employing the procedure of Example XXXII but replacing 1-(3,4-dichlorophenyl)-3-n-propyl-3-(prop-2-ynyl) urea with an equimolecular amount of 1-(3,4-dichlorophenyl)-3-(4-nitro-n-butyl)-3-(prop-2-ynyl) urea there is obtained 2-chloro-3-(3,4-dichlorophenyl)-1-(4-nitro-n-butyl)-4-methyl-imidazolium chloride, which chloride on treatment with aqueous sodium hydroxide provides 3-(3,4-dichlorophenyl)-1-(4-nitro-n-butyl)-4-methyl-imidazol-2-one.

Example XXXIX

To a suitable reaction vessel equipped with a thermometer, agitator and reflux condenser is charged 15.0 parts by weight of phosphorus pentachloride, 50 parts by weight of benzene, and 12.0 parts by weight of 1-phenyl-3-isopropyl-3-(prop-2-ynyl) urea. The so charged mass is refluxed for 6 hours. The reaction mass is cooled to room temperature and filtered. The filter cake is washed with diethyl ether and dried. The dried solid product (12.9 parts by weight) is 2-chloro-3-phenyl-1-isopropyl-4-methyl-imidazolium chloride. After recrystallizing from chloroform this solid melted at 204° C. with decomposition.

To a suitable reaction vessel equipped with a thermometer and agitator is charged 8.0 parts by weight of 2-chloro-3-phenyl-1-isopropyl-4-methyl-imidazolium chloride and 50 parts by weight of water. The resulting solution is made alkaline with 20 parts by weight of 20% aqueous sodium hydroxide. The precipitate is filtered off and dried. The dried product (5.9 parts by weight) is 3-phenyl-1-isopropyl-4-methyl-imidazol-2-one. After recrystallizing from ethyl acetate the melting point is found to be 53.3–54.1° C.

Example XL

Employing the procedure of Example XXXIX but replacing 1-phenyl-3-isopropyl-3-(prop-2-ynyl) urea with an equimolecular amount of 1-phenyl-1-ethyl-3-(prop-2-ynyl) urea there is obtained 2-chloro-3-phenyl-1-ethyl-4-methyl-imidazolium chloride, which chloride on treatment with aqueous sodium hydroxide provides 3-phenyl-1-ethyl-4-methyl-imidazol-2-one.

Example XLI

Employing the procedure of Example XXXIX but replacing 1-phenyl-3-isopropyl-3-(prop-2-ynyl) urea with an equimolecular amount of 1-phenyl-1-(2-choroallyl) 3-(prop-2-ynyl) urea there is obtained 2-chloro-3-phenyl-1-(2-chloroallyl)-4-methyl-imidazolium chloride, which chloride on treatment with aqueous sodium hydroxide provides 3-phenyl-1-(2-chloroallyl)-4-methyl-imidazol-2-one.

Example XLII

Employing the procedure of Example XXXIX but replacing 1-phenyl-3-isopropyl-3-(prop-2-ynyl) urea with an equimolecular amount of 1-phenyl-1-(2,3-dichloroallyl)-3-(prop-2-ynyl) urea there is obtained 2-chloro-3-phenyl-1-(2,3-dichloroallyl)-4-methyl-imidazolium chloride, which chloride on treatment with aqueous sodium hydroxide provides 3-phenyl-1-(2,3-dichloroallyl)-4-methyl-imidazol-2-one.

Example XLIII

Employing the procedure of Example XXXIX but replacing 1-phenyl-3-isopropyl-3-(prop-2-ynyl) urea with an equimolecular amount of 1-phenyl-1-(2-isopropoxyethyl)-3-(prop-2-ynyl) urea there is obtained 2-chloro-3 - phenyl - 1 - (2 - isopropoxyethyl) - 4 - methyl-imidazolium chloride, which chloride on treatment with aqueous sodium hydroxide provides 3-phenyl-1-(2-isopropoxyethyl)-4-methyl-imidazol-2-one.

Example XLIV

Employing the procedure of Example XXXIX but replacing 1-phenyl-3-isopropyl-3-(prop-2-ynyl) urea with an equimolecular amount of 1-phenyl-1-[2-(2-chloroethoxy)ethyl]-3-(prop-2-ynyl) urea there is obtained 2-chloro - 3 - phenyl - 1 - [2 - (2 - chloroethoxy)ethyl]-4-methyl-imidazolium chloride, which chloride on treatment with aqueous sodium hydroxide provides 3-phenyl-1-[2-(2-chloroethoxy)ethyl]-4-methyl-imidazol-2-one.

Example XLV

Employing the procedure of Example XXXIX but replacing 1-phenyl-3-isopropyl-3-(prop-2-ynyl) urea with an equimolecular amount of 1-phenyl-1-(2,3-dibromopropyl)-3-(prop-2-ynyl) urea there is obtained 2-chloro-3 - phenyl - 1 - (2,3 - dibromopropyl) - 4 - methyl-imidazolinum chloride, which chloride on treatment with aqueous sodium hydroxide provides 3-phenyl-1-(2,3-dibromopropyl)-4-methyl-imidazol-2-one.

Example XLVI

Employing the procedure of Example XXXIX but replacing 1-phenyl-3-isopropyl-3-(prop-2-ynyl) urea with an equimolecular amount of 1-phenyl-1-(4-ethoxyphenyl)-3-(prop-2-ynyl) urea there is obtained 2-chloro-3-phenyl-1-(4-ethoxyphenyl)-4-methyl-imidazolium chloride, which chloride on treatment with aqueous sodium hydroxide provides 3-phenyl-1-(4-ethoxyphenyl)-4-methyl-imidazol-2-one.

Example XLVII

To a suitable reaction vessel equipped with a thermometer, agitator and reflux condenser is charged 11.0 parts by weight of phosphorus pentachloride, 100 parts by weight of benzene, and 16.6 parts by weight of 1,3-di-(3,4-dichlorophenyl)-3-(prop-2-ynyl) urea. The so charged mass is refluxed for 6 hours. The reaction mass is cooled to room temperature and filtered. The filter cake is washed with diethyl ether and dried. The dried solid product (7.5 parts by weight) is 2-chloro-1,3-di(3,4-dichlorophenyl)-4-methyl-imidazolium chloride. After recrystallizing from chloroform this solid melted at 235° C. with decomposition.

To a suitable reaction vessel equipped with a thermometer and agitator is charged 4.4 parts by weight of 2-chloro-1,3-di(3,4-dichlorophenyl)-4-methyl-imidazolium chloride and 20 parts by weight of water. The resulting solution is made alkaline with 10 parts by weight of 20% aqueous sodium hydroxide. The precipitate is filtered off and dried. The dried product (1.8 parts by weight) is 1,3-di(3,4-dichlorophenyl)-4-methyl-imidazol-2-one. After recrystallizing from ethyl acetate the melting point is found to be 164.7–165.2° C.

Example XLVIII

Employing the procedure of Example XLVII but replacing 1,3-di(3,4-dichlorophenyl)-3-(prop-2-ynyl) urea with an equimolecular amount of 1,3-di(4-nitrophenyl)-3-(prop-2-ynyl) urea there is obtained 2-chloro-1,3-di(4-nitrophenyl)-4-methyl-imidazolium chloride, which chloride on treatment with aqueous sodium hydroxide provides 1,3-di(4-nitrophenyl)-4-methyl-imidazol-2-one.

Example XLIX

Employing the procedure of Example XLVII but replacing 1,3-di(3,4-dichlorophenyl)-3-(prop-2-ynyl) urea with an equimolecular amount of 1,3-di(4-ethoxyphenyl)-3-(prop-2-ynyl) urea there is obtained 2-chloro-1,3-di(4-ethoxyphenyl)-4-methyl-imidazolium chloride, which chloride on treatment with aqueous sodium hydroxide provides 1,3-di(4-ethoxyphenyl)-4-methyl-imidazol-2-one.

Example L

Employing the procedure of Example XLVII but replacing 1,3-di(3,4-dichlorophenyl)-3-(prop-2-ynyl) urea with an epimolecular amount of 1,3-di(2-chloro-4-nitrophenyl)-3-(prop-2-ynyl) urea there is obtained 2-chloro-1,3-di(2-chloro - 4 - nitrophenyl) - 4 - methyl-imidazolium chloride, which chloride on treatment with aqueous sodium hydroxide provides 1,3-di(2-chloro-4-nitrophenyl)-4-methyl-imidazol-2-one.

Example LI

Employing the procedure of Example XLVII but replacing 1,3-di(3,4-dichlorophenyl)-3-(prop-2-ynyl) urea with an equimolecular amount of 1,3-di(3-chloro-4-bromophenyl)-3-(prop-2-ynyl) urea there is obtained 2-chloro - 1,3 - di(3 - chloro - 4 - bromophenyl) - 4 - methyl-imidazolium chloride, which chloride on treatment with aqueous sodium hydroxide provides 1,3-di(3-chloro-4-bromophenyl)-4-methyl-imidazol-2-one.

Example LII

Employing the procedure of Example XLVII but replacing 1,3-di(3,4-dichlorophenyl)-3-(prop-2-ynyl) urea with an equimolecular amount of 1,3-di(3,4-dimethoxyphenyl)-3-(prop-2-ynyl) urea there is obtained 2-chloro-1,3-di(3,4-dimethoxyphenyl)-4-methyl-imidazolium chloride, which chloride on treatment with aqueous sodium hydroxide provides 1,3-di(3,4-dimethoxyphenyl)-4-methyl-imidazol-2-one.

Example LIII

Employing the procedure of Example XLVII but replacing 1,3-di(3,4-dichlorophenyl)-3-(prop-2-ynyl) urea with an equimolecular amount of 1,3-di(4-isohexylphenyl)-3-(prop-2-ynyl) urea there is obtained 2-chloro-1,3-di(4-isohexylphenyl) - 4 - methyl-imidazolium chloride, which chloride on treatment with aqueous sodium hydroxide provides 1,3-di(4-isohexylphenyl)-4-methyl-imidazol-2-one.

Example LIV

To a suitable reaction vessel equipped with a thermometer, agitator and reflux condenser is charged 24.7 parts by weight of phosphorus pentachloride, 100 parts by weight of benzene, and 31.0 parts by weight of 1-(4-ethoxyphenyl)-3-isopropyl-1-(prop-2-ynyl) urea. The so charged mass is refluxed for 6 hours. The reaction mass is cooled to room temperature and filtered. The filter cake is washed with diethyl ether and dried. The dried solid product (23.0 parts by weight) is 2-chloro-3-(4-ethoxyphenyl)-1-isopropyl - 4 - methyl-imidazolium chloride.

To a suitable reaction vessel equipped with a thermometer and agitator is charged 12.0 parts by weight of 2 - chloro - 3 - (4 - ethoxyphenyl) - 1 - isopropyl - 4-methyl-imidazolium chloride and 50 parts by weight of water. The resulting solution is made alkaline with 20 parts by weight of 20% aqueous sodium hydroxide. The precipitate is filtered off and dried. The dried product (9.5 parts by weight) is 3-(4-ethoxyphenyl)-1-isopropyl-4-methyl-imidazol-2-one. After recrystallizing from ethyl acetate the melting point is found to be 75.5–76.2° C.

*Example LV*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-n-propyl-3-(prop)-2-ynyl)urea there is obtained 2-chloro - 3 - (3,4 - dimethoxyphenyl) - 1 - n - propyl - 4-methyl-imidazolium chloride which chloride on treatment with aqueous sodium hydroxide provides 3-(3,4-dimethoxyphenyl)-1-n-propyl-4-methyl-imidazol-2-one.

*Example LVI*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-(but-2-enyl)-3-(prop-2-ynyl) urea there is obtained 2-chloro - 3 - (3,4 - dimethoxyphenyl) - 1 - (but - 2 - enyl)-4-methyl-imidazolium chloride, which chloride on treatment with aqueous sodium hydroxide provides 3-(3,4-dimethoxyphenyl) - 1 - (but - 2 - enyl) - 4 - methyl - imidazol-2-one.

*Example LVII*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-β-phenethyl-3-(prop-2-ynyl) urea there is obtained 2 - chloro - 3 - (3,4 - dimethoxyphenyl) - 1 - β - phenethyl-4-methyl-imidazolium chloride, which chloride on treatment with aqueous sodium hydroxide provides 3-(3,4 - dimethoxyphenyl) - 1 - β - phenethyl - 4 - methyl - imidazol-2-one.

*Example LVIII*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-cinnamyl-3-(prop-2-ynyl) urea there is obtained 2-chloro - 3 - (3,4 - dimethoxyphenyl) - 1 - cinnamyl - 4-methyl-imidazolium chloride, which chloride on treatment with aqueous sodium hydroxide provides 3-(3,4-dimethoxyphenyl)-1-cinnamyl-4-methyl-imidazol-2-one.

*Example LIX*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-(2,3-dichloropropyl)-3-(prop-3-ynyl) urea there is obtained 2-chloro-3-(3,4-dimethoxyphenyl)-1-(2,3-dichloropropyl)-4-methyl-imidazolium chloride, which chloride on treatment with aqueous sodium hydroxide provides 3 - (3,4 - dimethoxyphenyl) - 1 - (2,3 - dichloropropyl)-4-methyl-imidazol-2-one.

*Example LX*

Employing the procedure of Example LIV but replacing 1-(4-ethoxyphenyl)-3-isopropyl-3-(prop-2-ynyl) urea with an equimolecular amount of 1-(3,4-dimethoxyphenyl)-3-(4-chlorophenyl)-3-(prop-2-ynyl) urea there is obtained 2-chloro-3-(3,4-dimethoxyphenyl)-1-(4-chlorophenyl)-4-methyl-imidazolium chloride, which chloride on treatment with aqueous sodium hydroxide provides 3-(3,4-dimethoxyphenyl) - 1 - (4-chlorophenyl)-4-methyl-imidazol-2-one.

In the preparation of the 2-chloro-4-methyl-imidazolium chlorides a wide range of reaction conditions can be employed provided the reaction system is fluid (i.e., a temperature above the freezing point of the system up to and including the system's boiling point), however, in general reaction temperatures in the range of from about 50° C. to about 120° C. ordinarily are satisfactory. In general in reaction the N-(prop-2-ynyl) urea with phosphorus pentachloride it is preferable to employ an inert organic solvent such as benzene, toluene, xylene, heptane, etc. Ordinarily the urea reactant and phosphorus pentachloride will be used in substantially equimolecular amounts, however, a substantial excess of either reactant can be employed. While pressures above or below atmospheric can be employed in general the pressure employed will be atmospheric.

In the preparation of the 4-methyl-imidazol-2-ones from the corresponding 2-chloro-4-methyl-imidazolium chloride by treatment with alkali metal hydroxide an aqueous system will be employed. In general the treating temperature will be in the range of from about 10° C. to about 100° C. Ordinarily the molar ratio of alkali metal hydroxide to the imidazolium chloride reactant will be 2:1, however, a slight excess of alkali metal hydroxide can be employed.

The 4-methyl-imidazol-2-ones of this invention are bacteriostatically active against *Micrococcus pyogenes* var. *aureus*. The 2-chloro-4-methyl-imidazolium chlorides of this invention display insect repellent activity against the southern armyworm. Of the 4-methyl-imidazol-2-ones and the 2-chloro-4-methyl-imidazolium chlorides those of the aforedescribed formulae wherein R is lower alkyl (i.e., methyl, ethyl, propyl, butyl, amyl, or the various isomeric forms thereof containing up to 5 carbon atoms) are preferred. Another preferred class are those of the foregoing formulae wherein R' is a chlorophenyl radical of the empirical formula $C_6H_{5-n}Cl_n$ wherein $n$ is a whole number from 1 to 3.

While this invention has been described with respect to certain illustrative embodiments it is to be understood that it is not so limited and that variations and modifications thereof obvious to those skilled in the art can be made without departing from the spirit or scope of this invention.

The embodiments of the invention in which an exclusive property or privilege is claimed are defined as follows.

I claim:

1. A 2-chloro-4-methyl-imidazolium chloride of the formula

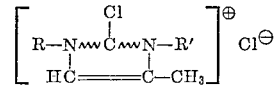

wherein the respective ⌇'s are unlike and selected from the group consisting of a double bond and a single bond, wherein R is selected from the group consisting of hydrocarbyl radicals having up to 12 carbon atoms and selected from the group consisting of cyclohexyl, phenyl, naphthyl, biphenylyl, alkyl substituted phenyl, phenyl substituted alkyl, alkyl and alkenyl and said hydrocarbyl radicals having substituents selected from the group consisting of lower alkoxy, nitro, and halogen having an atomic weight in the range of 35 to 80, and wherein R' is selected from the group consisting of phenyl and said phenyl radical having substituents selected from the group consisting of lower alkyl, lower alkoxy, nitro, and halogen having an atomic weight in the range of 35 to 80.

2. 2-chloro-3-(chloro substituted phenyl)-1-(alkyl)-4-(methyl)-imidazolium chloride wherein the alkyl substituent has up to 12 carbon atoms, and wherein the chloro substituted phenyl substituent has from 1 to 3 chlorine atoms.

3. 2-chloro-3-(chloro substituted phenyl) - 1 - (lower alkyl)-4-methyl-imidazolium chloride wherein the chloro substituted phenyl has from 1 to 3 chlorine atoms.

4. 2-chloro - 3 - (monochlorophenyl) - 1 - isopropyl-4-methyl-imidazolium chloride.

5. 2-chloro-3-(dichlorophenyl) - 1 - isopropyl-4-methyl-imidazolium chloride.

6. 2-chloro - 3 - (3,4-dichlorophenyl) - 1 - isopropyl-4-methyl-imidazolium chloride.

7. 2-chloro-3-(2-chlorophenyl) - 1 - isopropyl-4-methyl-imidazolium chloride.

8. 2-chloro-3-(4-chlorophenyl) - 1 - isopropyl-4-methyl-imidazolium chloride.

9. 2-chloro-3-phenyl-1-isopropyl - 4 - methyl-imidazolium chloride.

10. 2-chloro-3-(4-nitrophenyl) - 1 - isopropyl-4-methyl-imidazolium chloride.

11. The method of making the compounds of claim 1 which comprises reacting at a temperature above the freezing point of the system up to and including the system's boiling point phosphorus pentachloride with an N-(prop-2-ynyl) substituted urea of the formula

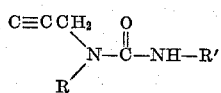

wherein R and R' have the same significance as in claim 1.

12. The method of making the compounds of claim 2 which comprises reacting at a temperature in the range of from about 50° C. to about 120° C. and in the presence of an inert organic solvent phosphorus pentachloride with an N-(prop-2-ynyl) substituted urea of the formula

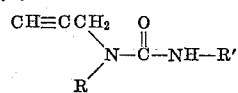

wherein R and R' have the same significance as in claim 2.

References Cited in the file of this patent
UNITED STATES PATENTS 2,493,319    Shonle et al.   ------------ Jan. 3, 1950
2,707,186    Duschinsky   ------------ Apr. 26, 1955

OTHER REFERENCES

Beilstein's Handbuch der Organischen Chemie, 4th edition, volume 23, page 48, Berlin, Springer, 1936.

Schipper et al.: In: Heterocyclic Compounds, volume 5, pages 247–48, ed. by Elderfield, New York, Wiley, 1957.